United States Patent
Tinianov (10) Patent No.: US 8,424,251 B2
(45) Date of Patent: Apr. 23, 2013

(54) SOUND PROOFING MATERIAL WITH IMPROVED DAMPING AND STRUCTURAL INTEGRITY

(75) Inventor: Brandon D. Tinianov, Santa Clara, CA (US)

(73) Assignee: Serious Energy, Inc., Sunnyvale, CA (US)

( * ) Notice: Subject to any disclaimer, the term of this patent is extended or adjusted under 35 U.S.C. 154(b) by 245 days.

(21) Appl. No.: 12/566,545

(22) Filed: Sep. 24, 2009

(65) Prior Publication Data

US 2011/0061324 A1   Mar. 17, 2011

Related U.S. Application Data

(63) Continuation-in-part of application No. 11/772,197, filed on Jun. 30, 2007, now Pat. No. 7,745,005, and a continuation-in-part of application No. 11/734,770, filed on Apr. 12, 2007, now Pat. No. 7,883,763.

(51) Int. Cl.
 *E04B 1/82* (2006.01)

(52) U.S. Cl.
 USPC ............ 52/144; 52/796.1; 181/290; 181/286; 156/71; 156/314

(58) Field of Classification Search .................... 52/144, 52/145, 783.1, 796.1, 800.1, 784.1; 181/285, 181/290, 286; 428/414; 156/71, 297, 299, 156/291, 310, 314
See application file for complete search history.

(56) References Cited

U.S. PATENT DOCUMENTS

| | | | |
|---|---|---|---|
| 2,811,906 A | 11/1957 | Chappell | |
| 3,092,250 A | 6/1963 | Knutson et al. | |
| 3,106,503 A | 10/1963 | Randall et al. | |
| 3,160,549 A | 12/1964 | Caldwell et al. | |
| 3,215,225 A | 11/1965 | Kirschner | |

(Continued)

FOREIGN PATENT DOCUMENTS

| CA | 2219785 A1 | 10/1996 |
|---|---|---|
| CN | 2134439 Y | 5/1993 |

(Continued)

OTHER PUBLICATIONS

English Language Abstract, JP Patent First Publication No. 09-203153, Aug. 5, 1997, (2 pages).

(Continued)

*Primary Examiner* — Robert Canfield
*Assistant Examiner* — Brent W Herring
(74) *Attorney, Agent, or Firm* — Haynes and Boone, LLP (57) ABSTRACT

Panels for use in building construction (partitions, walls, ceilings, floors or doors) which exhibit improved acoustical sound proofing in multiple specific frequency ranges and also present improved structural integrity, are provided. The improved performance is achieved through the use of one or more layers of glue such that at least one layer of glue includes a viscoelastic material in a first pattern and a structural adhesive in a second, non-overlapping pattern. The viscoelastic material may have a varied shear moduli and functions as a glue and energy dissipating layer. In some embodiments, one or more constraining layers separating one layer of glue may be included. The constraining layer may be formed of a material such as gypsum, cement, metal, cellulose, wood, or petroleum-based products such as vinyl, plastic, or rubber. In some embodiments, standard wallboard, typically gypsum, comprises the external surfaces of the laminated panel.

27 Claims, 9 Drawing Sheets

U.S. PATENT DOCUMENTS

| | | | |
|---|---|---|---|
| 3,336,710 A | 8/1967 | Raynes | |
| 3,399,104 A | 8/1968 | Ball, III et al. | |
| 3,424,270 A | 1/1969 | Hartman et al. | |
| 3,462,899 A | 8/1969 | Sherman | |
| 3,468,750 A | 9/1969 | Pfeifer et al. | |
| 3,579,941 A | 5/1971 | Tibbals | |
| 3,642,511 A | 2/1972 | Cohn et al. | |
| 3,652,360 A | 3/1972 | Hartman et al. | |
| 3,728,209 A | 4/1973 | Sugaike et al. | |
| 3,828,504 A | 8/1974 | Egerborg et al. | |
| 3,956,563 A * | 5/1976 | Spang et al. | 428/327 |
| 4,003,752 A | 1/1977 | Isohata et al. | |
| 4,112,176 A | 9/1978 | Bailey | |
| 4,117,197 A | 9/1978 | Krejci et al. | |
| 4,156,615 A | 5/1979 | Cukier et al. | |
| 4,259,220 A | 3/1981 | Bunnelle et al. | |
| 4,347,912 A | 9/1982 | Flocke et al. | |
| 4,364,017 A | 12/1982 | Tokunaga et al. | |
| 4,375,516 A | 3/1983 | Barrall | |
| 4,412,255 A | 10/1983 | Kuhlman et al. | |
| 4,487,793 A | 12/1984 | Haines et al. | |
| 4,488,619 A | 12/1984 | O'Neill | |
| 4,618,370 A | 10/1986 | Green et al. | |
| 4,642,951 A | 2/1987 | Mortimer | |
| 4,663,224 A | 5/1987 | Tabata et al. | |
| 4,678,515 A | 7/1987 | Green et al. | |
| 4,685,259 A | 8/1987 | Eberhart et al. | |
| 4,719,261 A | 1/1988 | Bunnelle et al. | |
| 4,759,164 A | 7/1988 | Abendroth et al. | |
| 4,778,028 A | 10/1988 | Staley | |
| 4,786,543 A | 11/1988 | Ferm | |
| 4,791,044 A | 12/1988 | Yoshino | |
| 4,806,703 A | 2/1989 | Sims | |
| 4,924,969 A | 5/1990 | L'Heureux | |
| 4,941,207 A | 7/1990 | Maeda et al. | |
| 4,956,321 A | 9/1990 | Barrall | |
| 4,965,408 A | 10/1990 | Chapman et al. | |
| 4,967,530 A | 11/1990 | Clunn | |
| 4,977,926 A | 12/1990 | Hocking | |
| 5,016,413 A | 5/1991 | Counihan | |
| 5,026,593 A | 6/1991 | O'Brien | |
| 5,033,247 A | 7/1991 | Clunn | |
| 5,063,098 A | 11/1991 | Niwa et al. | |
| 5,110,660 A | 5/1992 | Wolf et al. | |
| 5,125,475 A | 6/1992 | Ducharme et al. | |
| 5,158,612 A | 10/1992 | Savoly et al. | |
| 5,240,639 A | 8/1993 | Diez et al. | |
| 5,256,223 A | 10/1993 | Alberts et al. | |
| 5,258,585 A | 11/1993 | Juriga | |
| 5,304,415 A | 4/1994 | Kurihara et al. | |
| 5,334,806 A | 8/1994 | Avery | |
| 5,342,465 A | 8/1994 | Bronowicki et al. | |
| 5,368,914 A | 11/1994 | Barrett | |
| 5,439,735 A | 8/1995 | Jamison | |
| 5,473,122 A | 12/1995 | Kodiyalam et al. | |
| 5,474,840 A | 12/1995 | Landin | |
| 5,496,966 A | 3/1996 | Hightower et al. | |
| 5,502,931 A | 4/1996 | Munir | |
| 5,585,178 A | 12/1996 | Calhoun et al. | |
| 5,595,801 A | 1/1997 | Fahy et al. | |
| 5,603,192 A | 2/1997 | Dickson | |
| 5,629,503 A | 5/1997 | Thomasen | |
| 5,643,666 A | 7/1997 | Eckart et al. | |
| 5,644,880 A | 7/1997 | Lehnert et al. | |
| 5,664,397 A | 9/1997 | Holz | |
| 5,691,037 A | 11/1997 | McCutcheon et al. | |
| 5,695,867 A | 12/1997 | Saitoh et al. | |
| 5,768,841 A | 6/1998 | Swartz et al. | |
| 5,824,973 A | 10/1998 | Haines et al. | |
| 5,827,609 A | 10/1998 | Ercillo et al. | |
| 5,867,957 A | 2/1999 | Holtrop | |
| 5,907,932 A | 6/1999 | LeConte et al. | |
| 5,910,082 A | 6/1999 | Bender et al. | |
| 5,918,437 A | 7/1999 | Dobija | |
| 5,945,208 A | 8/1999 | Richards et al. | |
| 5,945,643 A | 8/1999 | Casser | |
| 5,954,497 A | 9/1999 | Cloud et al. | |
| 6,077,613 A | 6/2000 | Gaffigan | |
| 6,103,640 A | 8/2000 | Yoshikawa et al. | |
| 6,123,171 A | 9/2000 | McNett et al. | |
| 6,213,252 B1 | 4/2001 | Ducharme | |
| 6,238,594 B1 | 5/2001 | Turpin et al. | |
| 6,240,704 B1 | 6/2001 | Porter | |
| 6,266,427 B1 | 7/2001 | Mathur | |
| 6,286,280 B1 | 9/2001 | Fahmy et al. | |
| 6,290,021 B1 | 9/2001 | Strandgaard | |
| 6,309,985 B1 | 10/2001 | Virnelson et al. | |
| 6,342,284 B1 | 1/2002 | Yu et al. | |
| 6,381,196 B1 | 4/2002 | Hein et al. | |
| 6,389,771 B1 | 5/2002 | Moller | |
| 6,443,256 B1 | 9/2002 | Baig | |
| 6,443,257 B1 | 9/2002 | Wiker et al. | |
| 6,536,555 B1 | 3/2003 | Kelsic et al. | |
| 6,632,550 B1 | 10/2003 | Yu et al. | |
| 6,672,426 B2 | 1/2004 | Kakimoto et al. | |
| 6,676,744 B2 | 1/2004 | Merkley et al. | |
| 6,699,426 B1 | 3/2004 | Burke | |
| 6,715,241 B2 | 4/2004 | Gelin et al. | |
| 6,747,074 B1 | 6/2004 | Buckingham et al. | |
| 6,758,305 B2 | 7/2004 | Gelin et al. | |
| 6,790,520 B1 | 9/2004 | Todd et al. | |
| 6,790,525 B2 | 9/2004 | Takeuchi et al. | |
| 6,800,161 B2 | 10/2004 | Takigawa et al. | |
| 6,803,110 B2 | 10/2004 | Drees et al. | |
| 6,815,049 B2 | 11/2004 | Veeramasuneni et al. | |
| 6,822,033 B2 | 11/2004 | Yu et al. | |
| 6,825,137 B2 | 11/2004 | Fu et al. | |
| 6,877,585 B2 | 4/2005 | Tinianov | |
| 6,913,667 B2 | 7/2005 | Nudo et al. | |
| 6,920,723 B2 | 7/2005 | Downey | |
| 6,941,720 B2 | 9/2005 | DeFord et al. | |
| 7,012,190 B1 | 3/2006 | Price | |
| 7,041,377 B2 | 5/2006 | Miura et al. | |
| 7,068,033 B2 | 6/2006 | Sellers et al. | |
| 7,160,610 B2 | 1/2007 | Takeuchi et al. | |
| 7,181,891 B2 | 2/2007 | Surace et al. | |
| 7,197,855 B2 | 4/2007 | Della Pepa | |
| 7,307,223 B2 | 12/2007 | Tyson et al. | |
| 7,798,287 B1 * | 9/2010 | Surace et al. | 181/290 |
| 7,874,402 B2 * | 1/2011 | Doneux et al. | 181/290 |
| 7,883,763 B2 * | 2/2011 | Tinianov | 428/201 |
| 7,909,136 B2 * | 3/2011 | Surace et al. | 181/290 |
| 7,921,965 B1 * | 4/2011 | Surace | 181/290 |
| 8,028,800 B2 | 10/2011 | Ravnaas | |
| 2002/0009622 A1 | 1/2002 | Goodson | |
| 2002/0029929 A1 | 3/2002 | Tinianov | |
| 2002/0092703 A1 | 7/2002 | Gelin et al. | |
| 2002/0139611 A1 | 10/2002 | Baig | |
| 2003/0006090 A1 | 1/2003 | Reed | |
| 2003/0070367 A1 | 4/2003 | Gelin et al. | |
| 2003/0102184 A1 | 6/2003 | Brisson et al. | |
| 2003/0114064 A1 | 6/2003 | Fu et al. | |
| 2003/0117787 A1 | 6/2003 | Nakauchi | |
| 2003/0125447 A1 | 7/2003 | Hoch et al. | |
| 2003/0232190 A1 * | 12/2003 | O'Leary et al. | 428/343 |
| 2004/0016184 A1 | 1/2004 | Huebsch et al. | |
| 2004/0087721 A1 | 5/2004 | Bruhn et al. | |
| 2004/0168853 A1 | 9/2004 | Gunasekera et al. | |
| 2004/0177590 A1 | 9/2004 | Nudo et al. | |
| 2004/0214008 A1 | 10/2004 | Dobrusky et al. | |
| 2005/0040825 A1 | 2/2005 | Sellers et al. | |
| 2005/0050846 A1 | 3/2005 | Surace et al. | |
| 2005/0080193 A1 | 4/2005 | Wouters et al. | |
| 2005/0103568 A1 | 5/2005 | Sapolval et al. | |
| 2005/0136276 A1 | 6/2005 | Borup et al. | |
| 2006/0048682 A1 | 3/2006 | Wagh et al. | |
| 2006/0057345 A1 | 3/2006 | Surace et al. | |
| 2006/0059806 A1 | 3/2006 | Gosling et al. | |
| 2006/0108175 A1 | 5/2006 | Surace et al. | |
| 2006/0124388 A1 | 6/2006 | Pompei | |
| 2006/0260272 A1 | 11/2006 | Swiszez et al. | |
| 2007/0094950 A1 | 5/2007 | Surace et al. | |
| 2007/0107350 A1 | 5/2007 | Surace et al. | |
| 2007/0175173 A1 | 8/2007 | Babineau et al. | |
| 2008/0264721 A1 | 10/2008 | Tinianov et al. | |
| 2009/0000245 A1 | 1/2009 | Tinianov et al. | |

| | | | |
|---|---|---|---|
| 2009/0000866 A1 | 1/2009 | Tinianov | |
| 2009/0004448 A1 | 1/2009 | Tinianov | |
| 2010/0170746 A1* | 7/2010 | Restuccia et al. | 181/290 |

FOREIGN PATENT DOCUMENTS

| | | |
|---|---|---|
| CN | 1358684 | 7/2002 |
| EP | 0412816 A | 2/1991 |
| EP | 1154087 B1 | 11/2001 |
| EP | 1 388 836 A | 2/2004 |
| JP | 02-117825 A | 5/1990 |
| JP | 06-250669 A | 9/1994 |
| JP | 07-506158 A | 7/1995 |
| JP | 08-156173 A | 6/1996 |
| JP | 09-203153 A | 8/1997 |
| JP | 10-054096 A | 2/1998 |
| JP | 11-219186 A | 8/1999 |
| JP | 2001-522751 A | 11/2001 |
| JP | 2002-164690 | 6/2002 |
| JP | 2002-188231 A | 7/2002 |
| JP | 2002-520544 A | 7/2002 |
| JP | 2003-071834 A | 3/2003 |
| JP | 2003-221496 A | 8/2003 |
| WO | WO 93/21402 | 10/1993 |
| WO | 96/34261 A1 | 10/1996 |
| WO | 97/19033 A1 | 5/1997 |
| WO | 99/24290 A | 5/1999 |
| WO | 00/02204 A | 1/2000 |
| WO | 00/24690 A1 | 5/2000 |

OTHER PUBLICATIONS

*A Study of Techniques to Increase the Sound of Insulation of Building Elements*, Wyle Laboratories, Prepared for Dept. of Housing and Urban Development, Jun. 1973 (16 pages).
*Field Sound Insulation Evaluation of Load-Beating Sandwich Panels for Housing*, Final Report, Prepared by Robert E. Jones, Forest Products Laboratory, Forest Service, U.S. Department of Agriculture, Aug. 1975 (53 pages).
*Sound Studio Construction on a Budget*, F. Alton Everest, McGraw-Hill, 1997 (7 pages).
*Wood Handbook/Wood as an Engineering Material*, United States Department of Agriculture, Forest Service, General Technical Report FPL-GTR-113, Mar. 1999 (24 pages).
*Transmission Loss of Plasterboard Walls* by T.D. Northwood, Building Research Note, Division of Building Research, National Research Counsel, Ottawa, Canada, Jan. 19, 1970 (10 pages).
*A Guide to Airborne, Impact, and Structureborne Noise Control in Multifamily Dwellings*, U.S. Department of Housing and Urban Development, Prepared for the National Bureau of Standards, Washington, D.C., Jan. 1963 (5 pages).
*Transmission Loss of Leaded Building Materials*, Paul B. Ostergaard, Richmond L. Cardinell, and Lewis S. Goodfriend, The Journal of the Acoustical Society of America, vol. 35, No. 6, Jun. 1963 (7 pages).
*Dictionary of Architecture & Construction 2200 illustrations*, Third Edition, Edited by Cyril M. Harris, Professor Emeritus of Architecture Columbia University, McGraw-Hill, 2000 (7 pages).
Dictionary of Engineering Materials, Harald Keller, Uwe Erb, Wiley-Interscience by John Wiley & Sons, Inc. 2004 (4 pages).
*Chamber Science and Technology Dictionary*, by Professor Peter M.B. Walker, W & R Chambers Ltd and Cambridge University Press, 1988 (3 pages).
Notification of Transmittal of the International Search Report in corresponding International Application No. PCT/US08/68861 dated Sep. 5, 2008 (1 page).
International Search Report in corresponding International Application No. PCT/US08/68861 dated Sep. 5, 2008 (2 pages).
Written Opinion of the International Searching Authority in corresponding International Application No. PCT/US08/68861 dated Sep. 5, 2008 (8 pages).
Notification of Transmittal of the International Search Report in corresponding International Application No. PCT/US08/68863 dated Sep. 17, 2008 (1 page).
International Search Report in corresponding International Application No. PCT/US08/68863 dated Sep. 17, 2008 (2 pages).

Written Opinion of the International Searching Authority in corresponding International Application No. PCT/US08/68863 dated Sep. 17, 2008 (7 pages).
Pritz. "Loss Factor Peak of Viscoelastic Materials: Magnitude to Width Relations", J. of Sound and Vibration, 246(2): 265-280, 2001.
Noise and Vibration Control Engineering: *Principles and Applications*, Edited by Leo Beranek and Instvan Ver, Chapter 11, John Wiley & Sons, Inc., 1992, (12 pages).
Handbook of *Acoustical Measurements and Noise Control*, Edited by Cyril Harris, Chapter 32; Structureborne Sound Isolation, Chapter 33; Noise Control in Buildings, McGraw-Hill, Inc., 1991, (36 pages).
"Green Glue is your soundproofing solution and noise reduction material", www.greengluecompany.com. (2 pages).
Acoustical: *A Sound Approach to Testing*, www.archest.com/pages (2 pages).
STC—*Sound Transmission Class—Discussion and Use*, www.sota.ca/stc_info.htm (3 pages).
ASTM International, Designation: C 1396/C 1396M-04, *Standard Specification for Gypsum Board* (7 pages).
Barbara C. Lippiatt, National Institute of Standards and Technology. BEES 3.0, "*Building for Environmental and Economic Sustainability* Technical Manual and User Guide", Oct. 2002, (198 pages).
Takada, et al., *Effect in Reducing Floor Impact Noise of Recycled Paper Damper Members*, Bulletin of Tokyo Metropolitan Industrial Technology Research Institute, No. 2 (1999) [certified English translation] (13 pages).
*Architectural Acoustics*, M. David Egan, J. Ross Publishing (Reprint 2007) p. 211; originally published McGraw-Hill, 1988 (5 pages).
Hastings, Mardi C.; Godfrey, Richard; Babcock, G. Madison, *Application of Small Panel Damping Measurements to Larger Walls*, Proc. SPIE vol. 2720, p. 70-76, Smart Structures and Materials 1996: Passive Damping and Isolation (7 pages).
van Vuure, A.W.; Verpoest, I., Ko, F.K., *Sandwich-Fabric Panels As Spacers in a Constrained Layer Structural Damping Application*, Composited Part B 32 (2001) 11-19, Elsevier Science Ltd. (9 pages).
Noise and Vibration Control, Revised Edition, pp. 306-315, Institute of Noise Control Engineering, 1988, Beranek, Leo L. (editor) (9 pages).
Noise and Vibration Control, Chapter Fourteen, *Damping of Panels*, Ungar, Eric E., pp. 434-473, McGraw-Hill, 1971, Beranek, Leo L. (editor) (7 pages).
Nashif, Ahid D.; Jones, David I. G.; Henderson, John P., *Vibration Damping*, pp. 290-305, John Wiley & Sons, 1985 (18 pages).
Architectural Acoustics, Principles and Practice, John Wiley & sons, 1992, Cavanaugh, William J. and Wilkes, Joseph a. (editors) (332 pages).
Fire Resistance Design Manual, Sound Control, Gypsum Association, GA-600-94 (14$^{th}$ Ed.) (107 pages).
Fire Resistance Design Manual, Sound Control, Gypsum Association, GA-600-97 (15$^{th}$ Ed.) (120 pages).
Fire Resistance Design Manual, Sound Control, Gypsum Association, GA-600-2000 (16$^{th}$ Ed.) (139 pages).
Noxon, Arthur M., *The Chain is as Strong as its Weakest Link*, An article written for the first Hong Kong HiFi Show, 1993, Translated and Published in Chinese, http://www.acousticsciences.com/articles/chain.htm (7 pages).
*Quiet Lightweight Floor Systems*, Reprint from Sound and Vibration Magazine, Jul. 1992, by David A. Harris, Building & Acoustic Design Consultants (7 pages).
Joyal, Brian, *Constrained-Layer Systems Provide Weight-Efficient, High Level Damping* (4 pages).
Dynamat materials http://web.archive.org/web/20010525113753/www.admteschusa.com/Dynamat.html Jun. 12, 2007, ADM Tech—Dynamic Control (15 pages).
Noise Killer: Pro Damping Compound Materials http://www.tnt-audio.com/clinica/noise.html May 18, 2007, 1998 (3 pages).
Waybackmachine search results for Jan 1, 1996-Jun. 12, 2007 (1 page).
Frankovich, David, *The Four-Fold Method of Noise and Vibration Control* (8 pages).
Renninger, Jennifer, *Understanding Damping Techniques for Noise and Vibration Control* (8 pages).

Unified Facilities Criteria (UFC) *Noise and Vibration Control*, UFC 3-450-01. May 15, 200, Department of Defense (156 pages).

United States Gypsum, *Architectural and Construction Services, Design Data for Acousticians*, Feb. 1986 (4 pages).

*A Study of Techniques to Increase the Sound of Insulation of Building Elements*, Wyle Laboratories, Prepared for Dept. of Housing and Urban Development, Jun. 1973 (12 pages).

dB-Ply materials Sound Reducing Panels from Greenwood Forest Products, Inc., Apr. 24, 1997 (9 pages).

dB-Rock materials OMNI Products, Inc. (3 pages).

ASC WallDamp materials from Acoustic Sciences Corporation http://web.archive.org/web/20021013031149/www.asc-soundproof.com/index-walldamp... May 18, 2007 (21 pages).

Sounddown Viscoelastic Glue DG-A2, Soundown Corporation (2 pages).

Nordisk Akustik A/S materials, http://web.archive.org/web/200206240933724/www.nordisk-akustik.dk/html_uk/prod03.ht... Jun. 11, 2007 (4 pages).

IES 2000 *Dampening and Visocelastic Membranes* (Jul. 2, 2003) Atlanta.com/product (pp. 1-6).

Waybackmachine search results for Jan. 1, 1996-May 3, 2006 (1 page).

"*Damping of plate flexural vibrations by means of viscoelastic laminae*" by D. Ross, E.E. Ungar, and E.M. Kerwin—Structural Damping, Section III, ASME, 1959, New York (41 pages).

Vandersall, H. L., "*Intumescent Coating Systems, Their development and Chemistry*" J. Fire & Flammability, vol. 2 (Apr. 1971) pp. 97-140 (45 pages).

Japanese Office Action dated May 12, 2009 for corresponding Japanese Application No. 2006-525373.

Japanese Office Action dated Dec. 22, 2009 for corresponding Japanese Application No. 2006-525373.

Chinese Office Action dated Dec. 26, 2008 for corresponding Chinese Application No. 2004800325949.

Supplementary European Search Report dated Mar. 24, 2009 for corresponding European Application No. 04782564.1.

Spec-Data Quiet Solution Datasheet, Reed Construction Data, (2005).

Armstrong Basic Drywall Grid Installation Guide, http://web.archive.org/web/*/http://www.armstrong.com/common/c2002/content/files/4279.pdf. (Original Publication Date May 30, 2005, Retrieved Aug. 19, 2008).

Notification of Transmittal of the International Search Report in corresponding International Application No. PCT/US08/59960 dated Jul. 11, 2008 (1 page).

International Search Report in corresponding International Application No. PCT/US08/59960 dated Jul. 11, 2008 (2 pages).

Written Opinion of the International Searching Authority in corresponding International Application No. PCT/US09/59960 dated Jul. 11, 2008 (7 pages).

www.acousticalsolutions.com/products/pdfs/install_green_glue.pdf. accessed Nov. 5, 2009. web date Jun. 19, 2006.

Cheng et al. "Vibration Attenuation of Panel Structures by Optimally Shaped Viscoelastic Coating with Added Weight Considerations". Thin-Walled Structures, 21 (1995), pp. 307-326.

AVS Forum "Green Glue(R)", http://www.avsforum.com/avs-vb/archive/index.php/t-456614-p-2.html, retrieved Jul. 19, 2010.

International Search Report and Written Opinion for International Application No. PCT/US10/50272 dated Nov. 15, 2010.

Creton, Constantino, "*Pressure-Sensitive Adhesives: An Introductory Course*," MRS Bulletin, Jun. 2003, pp. 434-439.

Supplementary European Search Report, EP Application No. 06 82 7584, dated Nov. 4, 2009.

PCT/US06/43247, International Search Report and Written Opinion of the International Searching Authority (4 pages), dated Dec. 5, 2007.

M.N. Darrouj et al., "Optimum Design of Constrained Layer Damping Panels," Materials and Design, vol. 10, No. 4, pp. 202-208, Jul.-Aug. 1989.

D.I.G. Jones, Handbook of Viscoelastic Vibration Damping, John Wiley and Sons, pp. 284-297, Aug. 2001.

English Language Abstract of JP 2002-164690, published Jun. 7, 2002, 2 pages.

English Language Abstract of CN 1358684, Jul. 17, 2002, 1 page.

International Search Report and Written Opinion for International Application No. PCT/US2010/36411 dated Jul. 27, 2010.

Z. Xie at al., "An Enhanced Beam Model for Constrained Layer Damping and a Parameter Study of Damping Contribution," Journal of Sound and Vibration, vol. 319, Iss. 3-5, pp. 1271-1284, Jan. 23, 2009.

G. Lepoittevin et al. "Optimization of Segmented Constrained Layer Damping With Mathematical Programming Using Strain Energy Analysis and Modal Data," Materials and Design, vol. 31, Iss. 1, pp. 14-24, Jan. 2010.

Sidney Lauren, "Adhesives for Wallboard" in Adhesives in Building, Apr. 20, 1962, Building Research Institute, pp. 11-16.

\* cited by examiner

SOUND PROOFING MATERIAL WITH IMPROVED DAMPING AND STRUCTURAL INTEGRITY

CROSS-REFERENCE TO RELATED APPLICATIONS

This application is a continuation-in-part of, claims priority to and the benefit of, co-pending U.S. patent application Ser. No. 11/772,197 filed in the U.S. Patent and Trademark Office on Jun. 30, 2007, the entire contents of which are incorporated herein by reference. This application is also a continuation-in-part of, claims priority to and the benefit of, co-pending U.S. patent application Ser. No. 11/734,770 filed in the U.S. Patent and Trademark Office on Apr. 12, 2007, the entire contents of which are incorporated herein by reference.

RELATED PATENTS

This application is related to U.S. patent application Ser. No. 11/607,190 filed in the U.S. Patent and Trademark Office on Nov. 30, 2006, the entire contents of which are incorporated herein by reference.

BACKGROUND

Noise control constitutes a rapidly growing economic and public policy concern for the construction industry. Areas with high acoustical isolation (commonly referred to as 'soundproofed') are requested and required for a variety of purposes. Apartments, condominiums, hotels, schools and hospitals all require rooms with walls, ceilings and floors that reduce the transmission of sound thereby minimizing, or eliminating, the disturbance to people in adjacent rooms. Soundproofing is particularly important in buildings adjacent to public transportation, such as highways, airports and railroad lines. Additionally theaters, home theaters, music practice rooms, recording studios and the like require increased noise abatement. Likewise, hospitals and general healthcare facilities have begun to recognize acoustical comfort as an important part of a patient's recovery time. One measure of the severity of multi-party residential and commercial noise control issues is the widespread emergence of model building codes and design guidelines that specify minimum Sound Transmission Class (STC) ratings for specific wall structures within a building. Another measure is the broad emergence of litigation between homeowners and builders over the issue of unacceptable noise levels. To the detriment of the U.S. economy, both problems have resulted in major builders refusing to build homes, condos and apartments in certain municipalities; and in widespread cancellation of liability insurance for builders. The International Code Council has established that the minimum sound isolation between multiple tenant dwellings or between dwellings and corridors is a lab certified STC 50. Regional codes or builder specifications for these walls are often STC 60 or more. It is obvious that the problem is compounded when a single wall or structure is value engineered to minimize the material and labor involved during construction.

It is helpful to understand how STC is calculated in order to improve the performance of building partitions. STC is a single-number rating that acts as a weighted average of the noise attenuation (also termed transmission loss) of a partition across many acoustical frequencies. The STC is derived by fitting a reference rating curve to the sound transmission loss (TL) values measured for the 16 contiguous one-third octave frequency bands with nominal mid-band frequencies of 125 Hertz (Hz) to 4000 Hertz inclusive, by a standard method. The reference rating curve is fitted to the 16 measured TL values such that the sum of deficiencies (TL values less than the reference rating curve), does not exceed 32 decibels, and no single deficiency is greater than 8 decibels. The STC value is the numerical value of the reference contour at 500 Hz. For maximum STC rating, it is desirable for the performance of a partition to match the shape of the reference curve and minimize the total number of deficiencies.

An example of materials poorly designed for performance according to an STC-based evaluation is evident in the case of many typical wood framed wall assemblies. A single stud wall assembly with a single layer of type X gypsum wallboard on each side is recognized as having inadequate acoustical performance. That single stud wall has been laboratory tested to an STC 34—well below the STC 50 building code requirement. A similar wall configuration consisting of two layers of type X gypsum wall board on one side and a single layer of type X gypsum board on the other is an STC 36—only a slightly better result.

Various construction techniques and products have emerged to address the problem of noise control, such as: replacement of wooden framing studs with light gauge steel studs; alternative framing techniques such as staggered-stud and double-stud construction; additional gypsum drywall layers; the addition of resilient channels to offset and isolate drywall panels from framing studs; the addition of mass-loaded vinyl barriers; cellulose-based sound board; and the use of cellulose and fiberglass batt insulation in walls not requiring thermal control. All of these changes help reduce the noise transmission but not to such an extent that certain disturbing noises (e.g., those with significant low frequency content or high sound pressure levels) in a given room are prevented from being transmitted to a room designed for privacy or comfort. The noise may come from rooms above or below the occupied space, or from an outdoor noise source. In fact, several of the above named methods only offer a three to ten decibel improvement in acoustical performance over that of standard construction techniques that give no regard to acoustical isolation. Such a small improvement represents from a just noticeable difference to an incremental improvement, but not a soundproofing solution. A second concern with the above named techniques is that each involves the burden of either additional (sometimes costly) construction materials or extra labor expense due to complicated designs and additional assembly steps.

More recently, an alternative building noise control product having laminated panels utilizing a viscoelastic glue has been introduced to the market. Such panels are disclosed and claimed in U.S. Pat. No. 7,181,891 issued Feb. 27, 2007 to the assignee of the present application. This patent is hereby incorporated by reference herein in its entirety. The laminated panels disclosed and claimed in the '891 Patent include gypsum board layers assembled into a single soundproof assembly. The advantage of these laminated panels is that they eliminate the need for additional materials such as resilient channels, mass loaded vinyl barriers, and additional layers of drywall during initial construction. The resulting panel improves acoustical performance over the prior art panels by ten or more decibels in most cases and does so without the need for additional layers of construction materials or costly additional labor. However, the described panels are, in general, only optimized with regard to acoustics, with little regard to other material attributes, such as structural integrity. In all of these panels, one or more viscoelastic adhesives (for damping) are incorporated into the laminated panel solely for the purposes of damping and panel adhesion. As will be demonstrated below, such adhesive is designed to damp sound energy but may exhibit poorer performance with regard to panel shear resistance, creep of layers across each other, or the integrity of laminate after cutting the panel into smaller subpanel elements. The term subpanel refers to the fact that, often times, panels are cut to a fraction of the whole panel dimension to accommodate the dimensions and details of real rooms. For this reason, these prior art damped panels compromise the laminates' integrity in terms of the best acoustic energy isolation across its entire face.

A figure of merit for gauging the sound attenuating qualities of a material or method of construction is the material's Sound Transmission Class (STC). STC is a rating which is used to rate partitions, doors and windows for their effectiveness in reducing the transmission of sound. The STC rating is a result of acoustical testing, being derived from a best fit to a set of curves that define the sound transmission class. The test is conducted in such a way that the resulting measurement of the partition is independent of the test environment. The STC is therefore a number for the partition performance only. The STC measurement method is defined by ASTM E90 "Standard Test Method Laboratory Measurement of Airborne Sound Transmission Loss of Building Partitions and Elements," and ASTM E413 "Classification for Sound Insulation," used to calculate STC ratings from the sound transmission loss data for a given structure. These standards are available on the Internet at http://www.astm.org.

A second figure of merit is the panel's structural integrity. For some embodiments of the present invention, one or more test methods may be employed to determine the structural integrity of the damped panels. Such tests are designed to investigate the use of a combination of a structural adhesive and a visco-elastic adhesive to improve the stability of damped panels. The test methods may include the following separate tests performed on the structures: an adhesive bond strength test, a stack holding strength test, a creep resistance test, and a shear strength test. In a stack holding strength test, the materials are formed under normal manufacturing conditions and stacked under weight, for drying. The specimens to be tested are supported by one another and by a number of gypsum risers (4 in some embodiments of the test method) at the base of the stack.

The stack holding strength test may include the arrangement of a large number of panels stacked in a lift. This stack may hold for example thirty to fifty panels, or more. The stack is then placed without end-caps or strapping.

The additional creep resistance test may include one board taken from the damped panel stack and leaned against a wall at a 20 degree angle. The board is left to sit under its own weight and the movement of the unrestrained top half of the board is monitored and recorded at regular intervals (e.g. twelve hours apart), until an offset between the two halves of the panels reaches one quarter inch. The time required to reach such offset is recorded.

Typically, a board left overnight (i.e. for over 12 hours) that shows no sign of an offset is qualified under this test protocol.

For the shear strength test, several panels are glued together in a stack and allowed to dry. In some cases, the panels in the stack are about 10 ft long. The stack is then lifted and lowered with a forklift, ten times. The forks on the forklift are set closely together (e.g. at six inches apart from each other). This test subjects the adhesive bond to bending stresses higher than those that would normally be encountered during typical panel transport and bulk handling. The conditions of the boards are monitored while the boards are elevated. If the ends of the boards are offset, then the adhesive has failed, which allowed the panel halves to slide across each other. For the purposes of evaluation, the board is then split and the adhesive bond is viewed to see if the failure occurred in the substrate or the adhesive.

A final evaluation method is the adhesive bond strength test. The adhesive bond strength test tests the bond of the adhesive to the substrate, as compared to the internal structural strength of the substrate. In some embodiments, a wooden dowel or handle is glued to a paper faced gypsum board and bare gypsum substrate, using the adhesive under test. After curing the adhesive, the wooden dowel or handle is torn from the substrate by pure tension; the resulting two pieces are analyzed to see if some of the substrate was pulled off by the adhesive. The amount of adhesive failure is measured by the ratio of the area of the substrate that is not removed and remains intact, to the total area of the adhesive. Typically, a structure is qualified as passing this test when more than 95% of the substrate area covered by the glue is removed upon strain-induced bond failure.

Accordingly, what is needed is a new building construction material and a new method of construction that allows for the maximum reduction of noise transmission at low frequencies, high frequencies, or both simultaneously, while also providing structural integrity. What is needed is a panel designed to optimize both the acoustical and structural performance in typical lightweight frame construction.

SUMMARY OF THE INVENTION

In accordance with some embodiments of the present invention, a new laminated panel and an associated manufacturing process are disclosed which significantly improves the ability of a wall, ceiling, floor or door to resist the transmission of noise from one room to an adjacent room, or from the exterior to the interior of a room, or from the interior to the exterior of a room while maintaining a superior panel structural integrity.

In one embodiment the panel comprises a lamination of several different materials and multiple adhesive formulations. In accordance with one embodiment, a laminated substitute for drywall comprises a first layer of selected thickness gypsum board which is glued to a second layer of selected thickness gypsum material. The first adhesive has a low shear modulus of about $5.0 \times 10^3$ Pascals, designed to achieve maximum damping across the typical range of noise frequencies (about 100-4000 Hz). This first adhesive is applied across the majority of the first gypsum layer. In addition to the first viscoelastic adhesive, a second adhesive is applied around the perimeter area and typical nailing regions of the panel. The second adhesive layer has a much higher shear modulus of about $1.0 \times 10^8$ Pascals, typical of a commercial structural adhesive. In one embodiment, the second adhesive is applied in one inch wide stripes along the long axis of the panel at 24 inch intervals (three stripes total). These stripes correspond to the approximate locations of the supporting studs (wood or metal) in a lightweight wall construction in which the studs are spaced at 24 inch intervals. The first adhesive may be a specially formulated QuietGlue® adhesive, which is a viscoelastic material available from Serious Materials, 1250 Elko Drive, Sunnyvale, Calif. 94089. In addition to the typical chemicals that make up the QuietGlue® adhesive, additional plasticizing compounds may be added to aid the shift of the shear modulus to achieve maximum damping at a target range of frequencies, according to some embodiments of the present invention. The second adhesive may be one of many commercially available structural adhesives including, but not limited to: Liquid Nails, manufactured by Akzo Nobel Paints of Amsterdam, Netherlands; Beats The Nail, manufactured by DAP of Baltimore, Md.; PL Adhesive, manufactured by Henkel Corporation of Dusseldorf, Germany, or other similar glues.

Formed on the interior surfaces of the two gypsum boards, the glue layer is about 1/32 inch thick. In one instance, a 4 foot×8 foot panel consisting of two 5/16 inch thick gypsum wall board panels, laminated together using a 1/32 inch thick layer of glue, has a total thickness of approximately 5/8 inch. When used on both sides of a standard single wood stud frame, the assembly has an STC value of approximately 54. For comparison, a similar wall assembly constructed with 1/2 inch thick standard gypsum wallboard has an STC rating of approximately 34. The result is a reduction in noise transmitted through the wall structure of approximately 20 decibels, compared to the same structure using common (untreated) gypsum boards of equivalent mass and thickness, and construction effort.

BRIEF DESCRIPTION OF THE DRAWINGS

This invention will be more fully understood in light of the following drawings taken together with the following detailed description in which.

DETAILED DESCRIPTION OF SOME EMBODIMENTS

The following detailed description is meant to be exemplary only and not limiting. Other embodiments of the present disclosure, such as the number, type, thickness, dimensions, area, shape, and placement order of both external and internal layer materials, will be obvious to those skilled in the art, in view of this description.

The process for creating laminated panels in accordance with some embodiments of the present disclosure takes into account many factors: exact chemical composition of the glue; pressing process; and drying and dehumidification process. The descriptions and embodiments that will be given hereafter are exemplary in nature, and it should be understood that variations in size, dimensions, shapes, and relative quantities of materials and compositions will be obvious for one of ordinary skill in the art, based on the following description.

Figure 1:
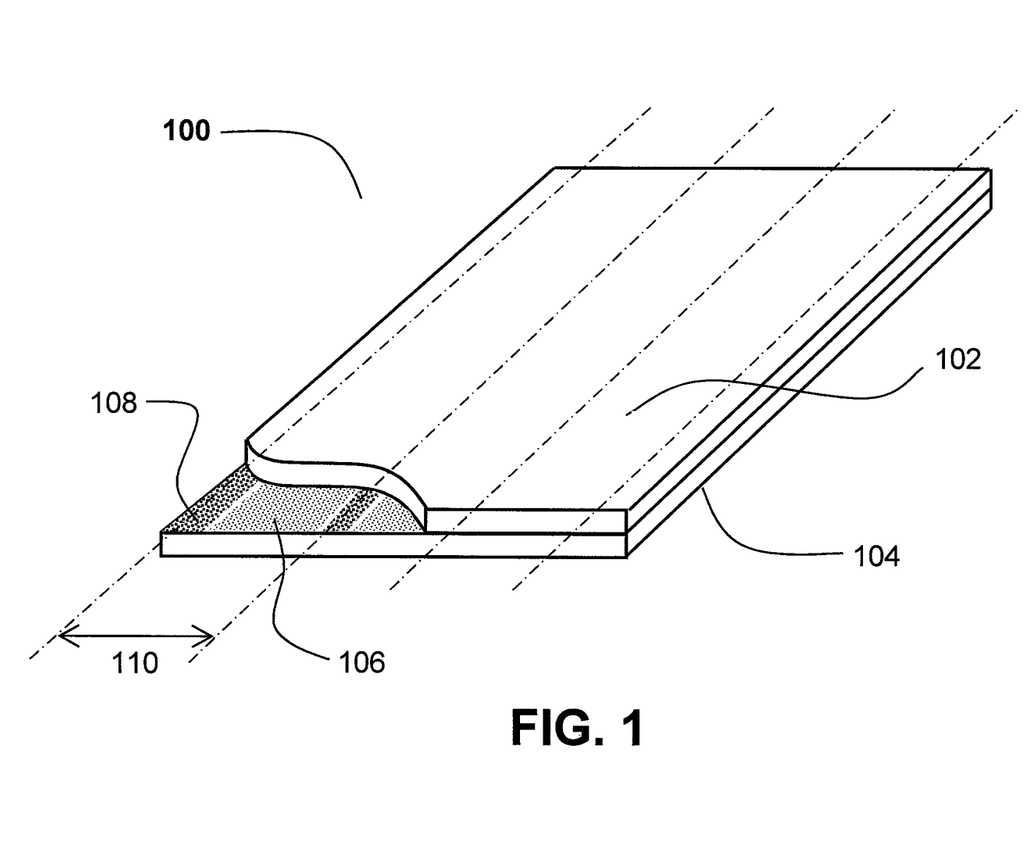
FIG. 1 shows a perspective view of an embodiment of a laminated panel fabricated in accordance with this invention for minimizing the transmission of sound through the material, while maintaining the superior structural integrity of the panel.

FIG. 1 shows laminated panel 100 according to one embodiment of the present disclosure. In FIG. 1, the layers in the panel are described from top to bottom with the panel oriented horizontally as shown. It should be understood, however, that the laminated panel according to some embodiments of the present disclosure will be oriented vertically when placed on vertical walls and doors, as well as horizontally or even at an angle when placed on ceilings and floors. Therefore, the reference to top and bottom layers is to be understood to refer only to these layers as oriented in FIG. 1 and not in the context of the vertical or other use of this panel.

In FIG. 1, reference character 100 refers to the entire laminated panel. A top layer 102 is made up of a standard gypsum material and in one embodiment is 5/16 inch thick.

A second gypsum board layer 104 is placed below layer 102. In one embodiment, second gypsum board layer 104 is 5/16 inch thick. Between gypsum boards 102 and 104 a patterned layer of a first glue 106, and a second glue 108 are provided. The two glue layers serve two different purposes and therefore have different formulations. The first glue 106 includes a viscoelastic polymer modified with additives to optimize the sound dissipation at the audible range of frequencies. The first glue 106 has an extremely low shear modulus of about $10^2$ to $10^6$ Pascals; typically, the shear modulus of a viscoelastic glue with improved sound dissipation characteristics is less than $10^4$ Pascals. An exemplary embodiment of a viscoelastic glue is described in detail below. Conversely, the second glue 108 is a structural adhesive with a very high shear modulus of $10^6$ Pascals or more. One example of such glue, which is commercially available, is called Liquid Nails adhesive from Akzo Nobel Paints of Amsterdam, Netherlands. The shear modulus for Liquid Nails is $1\times10^6$ wet, and $2\times10^6$ dry. The patterns of the first glue 106 and the second glue 108 are located such that the second glue 108 lies over the expected structural framing locations (joists and studs) whereas the first glue 106 is located in the large areas between expected structural framing locations. These will be further described in later figures. Glue layers 106 and 108 may have a thickness from about 1/64 inch to about 1/8 inch thickness although other thicknesses may be used. Areas where the second glue 108 is placed, are separated by a selected distance 110.

Figure 2:
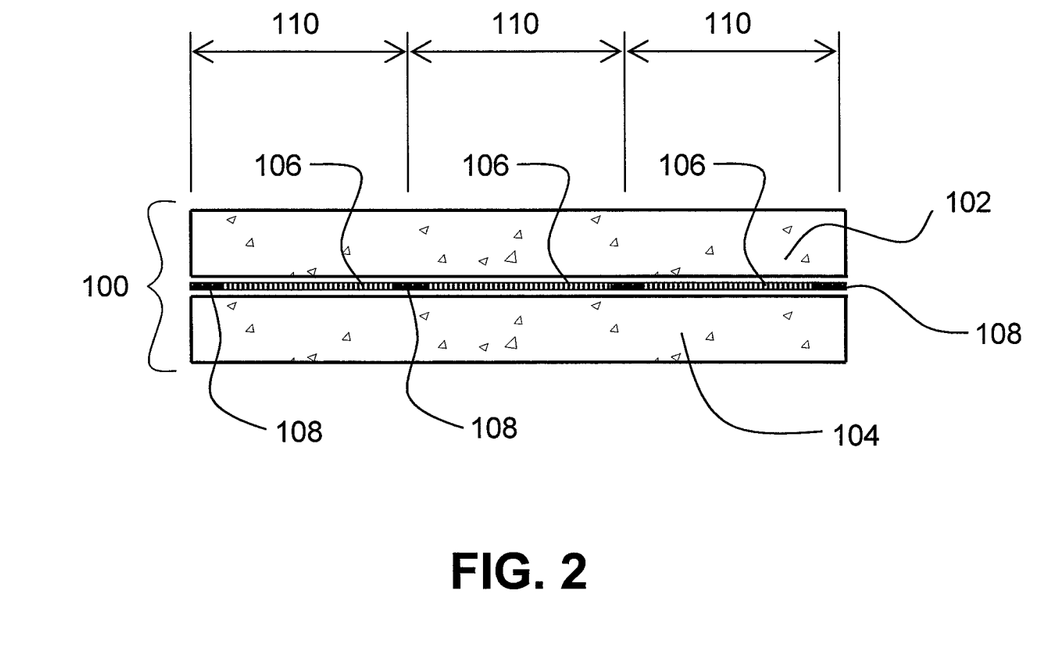
FIG. 2 shows a cross-section view of an embodiment of a laminated panel fabricated in accordance with this invention for minimizing the transmission of sound through the material, while maintaining the superior structural integrity of the panel.

FIG. 2 shows the same laminated panel 100 shown in a cross section view. As with FIG. 1, a top layer 102 is made up of a standard gypsum material and in one embodiment is 5/16 inch thick. Of course, many other combinations and thicknesses can be used for any of the layers, as desired. The thicknesses are limited only by the acoustical attenuation (i.e., STC rating) desired for the resulting laminated panel and by the weight of the resulting structure which will limit the ability of workers to install the laminated panels on walls, ceilings, floors and doors for its intended use. Alternatively, layer 102 may be any one of a layer of cement-based board, wood, magnesium oxide-based board or calcium silicate board. A second gypsum board layer 104 is placed below layer 102. In one embodiment is 5/16 inch thick. In addition to gypsum as a panel material, 104 may be any one of a layer of cement-based board, wood, magnesium oxide-based board or calcium silicate board. Next, between gypsum boards 102 and 104 is a patterned layer of two glues 106 and 108. Glue layers 106 and 108 may have a thickness from about 1/64 inch to about 1/8 inch thickness although other thicknesses may be used. The glue layers are placed in different locations (do not overlap) but share the same horizontal plane. The patterns of the two glue types 106 and 108 are located such that glue 108 lies over the expected structural framing locations (joists and studs) whereas 104 is located in the large areas between expected structural framing locations. In FIG. 2, glue 108 is in stripes about 1 to 2 inches wide, spaced at a selected distance 110. For typical residential construction, wall studs are placed at 16 inch intervals throughout the home. Therefore, distance 110 is 16 inches in order to place the structural glue stripes 108 in alignment with the wall studs. These stripes are also important because if the panel is cut or trimmed for field installation the reduced-area subpanel will rely on glue 108 for lamination integrity. The trimmed panel may then be placed in the building structure such that the glue stripes 108 are aligned with the framing members.

Between the structural members where the panels are fastened with nails or screws, the panel is free to vibrate and does so when subjected to a sound field. In this vibrating region of the panel, the first glue 106, which is viscoelastic, is placed. Typically, the first glue 106 is made of the materials as set forth in TABLE 1, although other glues having similar characteristics to those set forth directly below Table 1 can also be used in some embodiments of the present disclosure.

An important characteristic of the first glue composition and the overall laminated panel is the shear modulus of the first glue, when cured. The shear modulus can be modified from $10^2$ to $10^6$ N/m$^2$ (or Pascals) depending on the frequency range of interest for noise attenuation, with the given materials provided within the given ranges listed in Table 1.

TABLE 1

QuietGlue ® Adhesive Chemical Makeup

| COMPONENTS | WEIGHT % | | |
|---|---|---|---|
| | Min | Max | Preferred |
| acrylate polymer | 33.0% | 70.0% | 60% |
| ethyl acrylate, methacrylic acid, polymer with ethyl-2-propenoate | 0.05% | 3.00% | 0.37% |
| hydrophobic silica | 0.00% | 0.500% | 0.21% |
| paraffin oil | 0.10% | 4.00% | 1.95% |
| silicon dioxide | 0.00% | 0.30% | 0.13% |
| sodium carbonate | 0.01% | 1.50% | 0.66% |
| stearic acid, aluminum salt | 0.00% | 0.30% | 0.13% |
| surfactant | 0.00% | 1.00% | 0.55% |
| rosin ester | 1.00% | 9.00% | 4.96% |
| water | 25.0% | 40.0% | 30.9% |
| 2-Pyridinethiol, 1-oxide, sodium salt | 0.00% | 0.30% | 0.17% |

The preferred formulation is but one example of a viscoelastic glue. Other formulations may be used to achieve similar results and the range given is an example of successful formulations investigated here.

The physical solid-state characteristics of QuietGlue® adhesive include:
1) a broad glass transition temperature below room temperature;
2) mechanical response typical of a rubber (i.e., elongation at break, low elastic modulus);
3) shear modulus between $10^2$ and $10^6$ N/m$^2$ at room temperature;
4) does not dissolve in water (swells poorly); and
5) peels off the substrate easily at the temperature of dry ice.

QuietGlue® adhesive may be obtained from Serious Materials, 1250 Elko Drive, Sunnyvale, Calif. 94089.

Because of the desired low shear modulus of first glue 106, a panel laminated exclusively with this adhesive will have problems remaining well bonded under a range of environments and conditions. Further, the external layers 102 and 104 may creep or be displaced across each other when stored at an angle or when subjected to mild curvature. For this reason, glue 108 is used to hold the panels in place under any condition.

Figure 3:
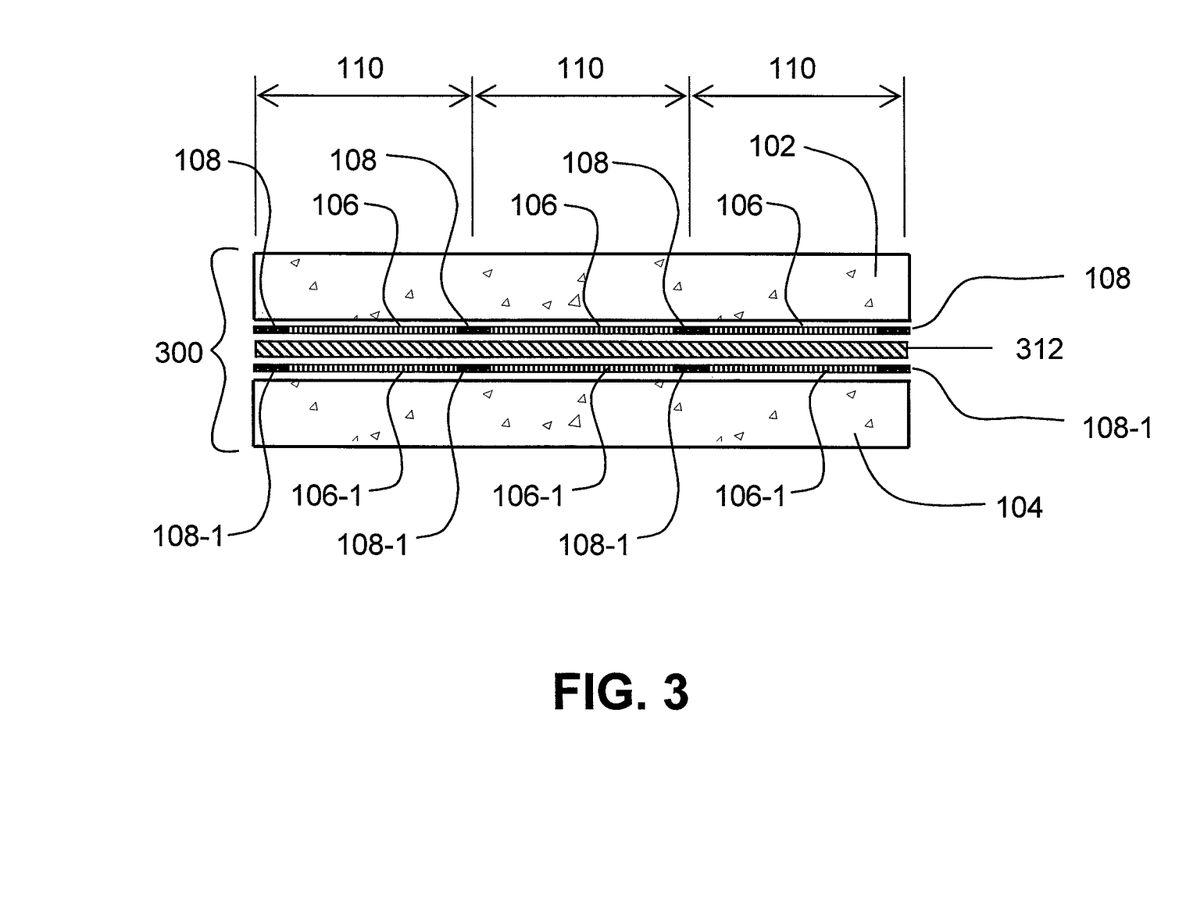
FIG. 3 shows a cross-section view of another embodiment of a laminated panel fabricated in accordance with this invention for minimizing the transmission of sound through the material, while maintaining the superior structural integrity of the panel.

FIG. 3 shows another embodiment of the present disclosure which incorporates an internal constraining layer 312. As shown in FIGS. 0.1 and 2, top and bottom layers 102 and 104 are made up of a standard gypsum material and in one embodiment are 5/16 inch thick. Alternately, layers 102 and 104 may be any one of a layer of cement-based board, wood, magnesium oxide-based board or calcium silicate board. Applied to the bottom surface of layer 102 is a plane of the first glue 106, which is viscoelastic and the second glue 108, which is a structural adhesive. In the same manner shown in FIG. 2, the stripes of second glue 108 are spaced at a selected distance 110. The first glue 106 is located in the regions between the distances 110. On the upper surface of layer 104 is a plane of viscoelastic glue 106-1 and structural adhesive 108-1. Glues 106-1 and 108-1 have the same formulation and applied in the same pattern as first glue 106 and second glue 108, respectively.

Referring to FIGS. 1-3, the width of the stripes of second glue 108 should be sufficient to provide structural integrity to the panel prior to its installation on the frame. Typically, a stripe of about ½ to 1½ inches is enough for this purpose. A width that is significantly smaller than ¼ inches should be avoided, specifically, no less than ⅛ inches. In addition, the width of the stripes of second glue 108 should not exceed a certain value, because otherwise this may compromise the sound absorbing and sound attenuation properties of glue layer 106. This is described in detail in U.S. patent application Ser. No. 11/734,770, assigned to the assignee of the present application and incorporated herein by reference in its entirety. Specifically, the width of the stripes of second glue 108 should be such that no less than 20% of the total surface area of the panel is covered by glue layer 106. Also, the width of the stripes of second glue 108 should be such that the spacing between the edges of the patches of glue layer 106 is no greater than a half wavelength of sound in the frequency of interest for sound attenuation of the panels. In one embodiment of the present disclosure, the width of the stripes of second glue 108 is no greater than 2 inches.

Adjacent to glue layers 106 and 108 is a constraining layer 312 made up of gypsum, vinyl, steel, wood, cement or another material suitable for the application. If layer 312 is vinyl, the vinyl is mass loaded and, in one embodiment, has a surface density of one pound per square foot or greater. Mass loaded vinyl is available from a number of manufacturers, including Technifoam, of Minneapolis, Minn. The constraining layer 312 may improve the sound attenuation and physical characteristics' of a laminated panel so constructed.

In some embodiments of the present disclosure, constraining layer 312 may be galvanized steel of a thickness such as 30 gauge (0.012 inch thick). Steel has a higher Young's Modulus than vinyl and thus can outperform vinyl as an acoustic constraining layer. However, for other ease-of-cutting reasons, vinyl can be used in the laminated panel in place of steel. Cellulose, wood, plastic, cement or other constraining materials may also be used in place of vinyl or metal. The alternate material can be any type and any appropriate thickness. In the embodiment depicted in FIG. 3, the constraining material 312 approximates the size and shape of the glue layers 106 and 108 to which it is applied. Some embodiments may provide a constraining layer 312 with a size and shape approximating those of external panels 102 and 104.

Figure 4A:
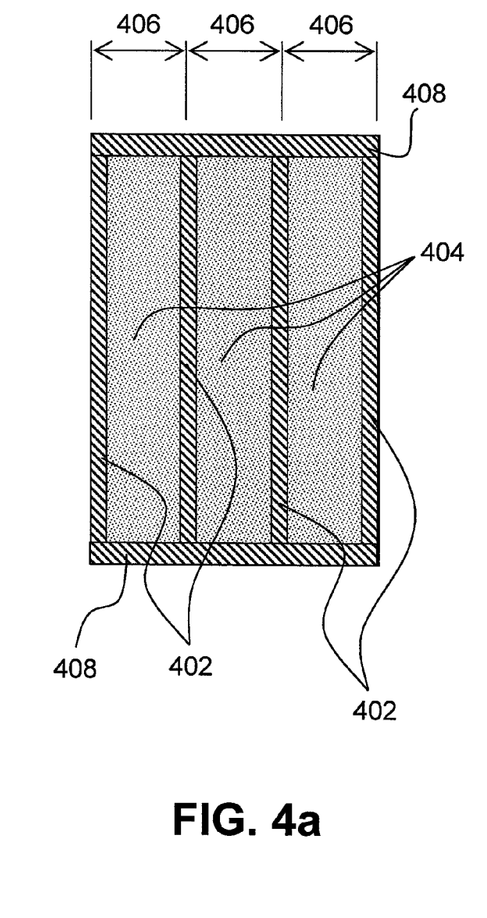
FIG. 4a-c show plan views of possible glue patterns for the two adhesives in accordance with this invention for minimizing the transmission of sound through the material, while maintaining the superior structural integrity of the panel.
Figure 4B:
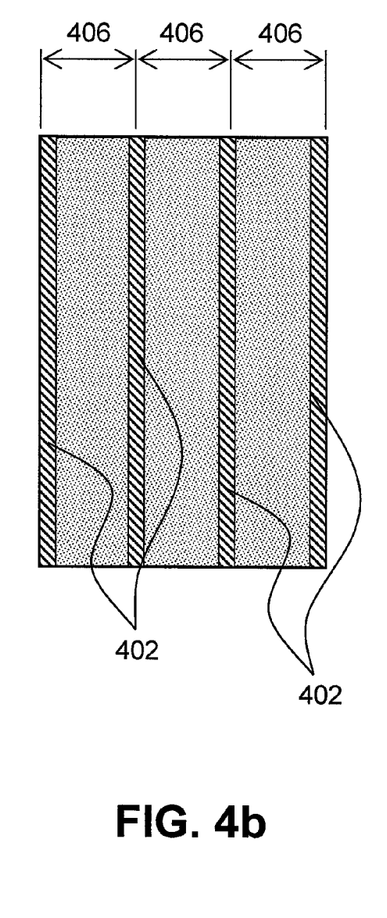
Figure 4C:
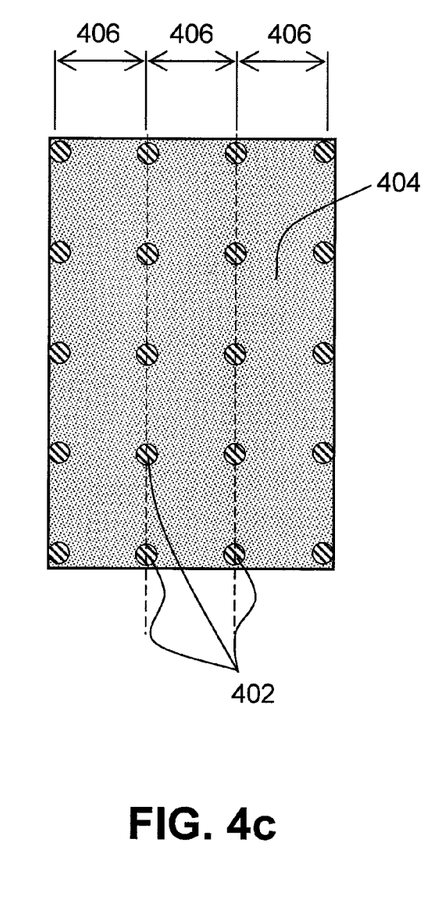

FIGS. 4a-c show the glue plane in plan view with various patterns. In FIG. 4a, the structural adhesive areas covered with the second glue are shown as 402 and 408. The viscoelastic adhesive areas covered with the first glue are shown as regions 404, in between stripes 402 (FIGS. 4a-b), or surrounding the patterns of second glue 402 (FIG. 4c). Structural glue stripes 402 are separated by a selected distance 406. Distance 406 would be 16 inches for a 48 inch wide panel, which is a standard panel dimension in the construction industry. Structural glue stripes 408 correspond to the locations of the "top plate" and "bottom plate," which are structural members present in typical framed construction. FIG. 4b shows the same glue pattern, but with the "top plate" and "bottom plate" structural adhesive stripe 408 not present. In FIG. 4c, instead of structural adhesive stripes, the structural adhesive 402 is applied as intermittent spots or circles. These are also spaced at a selected distance 406 corresponding to the spacing of the structural framing members. Region 404 is the location of the viscoelastic glue.

Figure 5A:
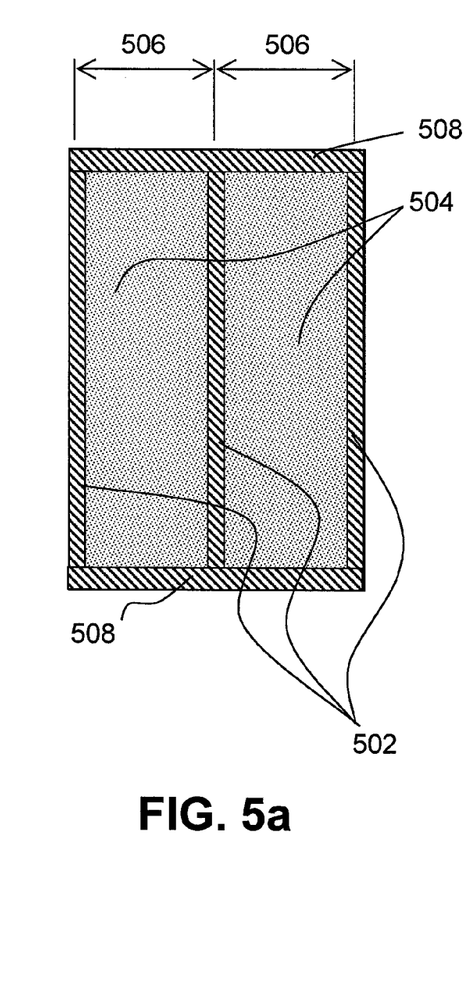
FIG. 5a-c show plan views of alternate possible glue patterns for the two adhesives in accordance with this invention for minimizing the transmission of sound through the material, while maintaining the superior structural integrity of the panel.
Figures 5B, 5C:
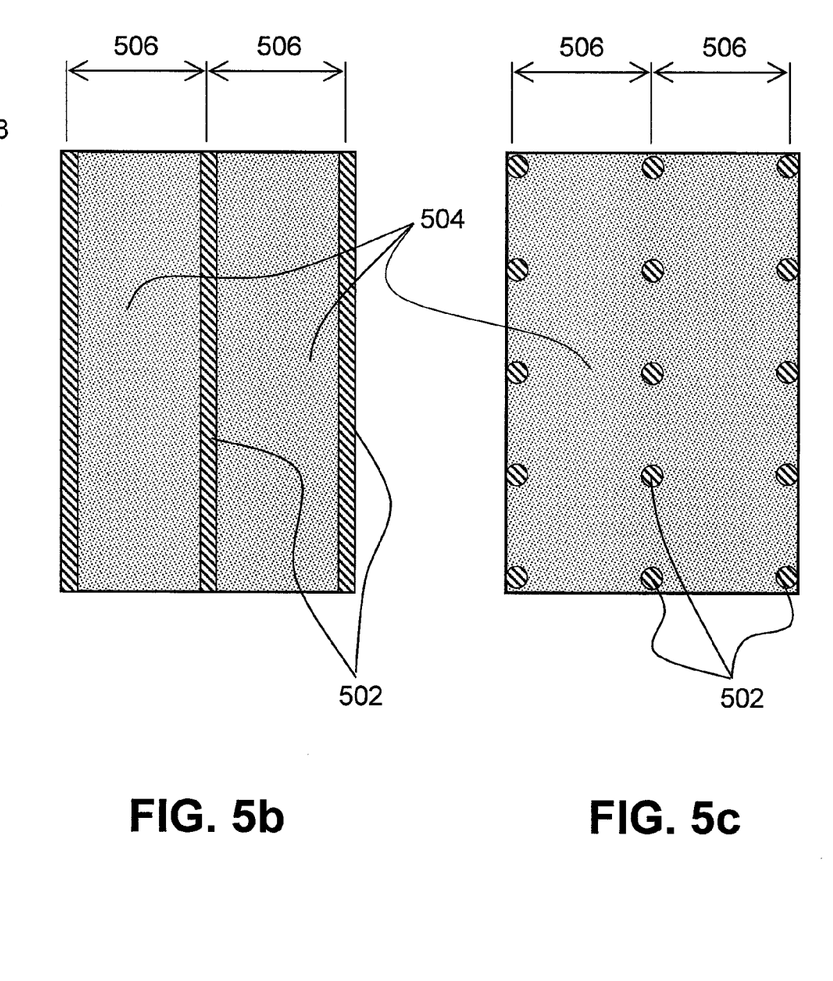

The embodiments depicted in FIGS. 5a-c are similar to those of FIGS. 4a-c as they show the glue plane in plan view with various patterns. In FIGS. 5a-c, the selected distance 506 corresponds to the interval of structural framing members typical of commercial (non-residential) construction. In FIG. 5a, the structural adhesive areas covered with the second glue are shown as 502 and 508. The viscoelastic adhesive areas covered with the first glue are shown as the regions 504, in between stripes 502. Structural glue stripes 502 are separated by a distance 506. Distance 506 would be 24 inches for a 48 inch wide panel, which is a standard panel dimension in the construction industry. Structural glue stripes 508 correspond to the locations of the "top plate" and "bottom plate," which are structural members present in typical framed construction. FIG. 5b shows the same glue pattern, but with the "top plate" and "bottom plate" structural adhesive stripes 508 not present. In FIG. 5c, instead of structural adhesive stripes, the structural adhesive 502 is applied as intermittent spots or circles. These are also spaced at a selected distance 506, corresponding to the spacing of the structural framing members. Region 504 is the location of the viscoelastic glue.

Referring to FIGS. 4a-c and FIGS. 5a-c, the width of the stripes and glue areas of second glue 402 (FIGS. 4a-c) and 502 (FIGS. 5a-c) should be sufficient to provide structural integrity to the panel, prior to its installation on the frame. Typically, a stripe or glue area of about ½ to 1½ inches in width or diameter is enough for this purpose. A width or diameter that is significantly smaller than ¼ inches should be avoided, more specifically, no less than ⅛ inches. In addition, the width of the stripes or the diameter of the area of second glue 402 and 502 should not exceed a certain value, because otherwise this may compromise the sound absorbing and sound attenuation properties of glue layer 404 and 504. Specifically, the width of the stripes or the diameter of the area of second glue 402 and 502 should be such that no less than 20% of the total surface area of the panel is covered by glue layer 404 and 504. Also, the width of the stripes or the diameter of the area of second glue 402 and 502 should be such that the spacing between the edges of the patches of glue layer 404 and 504 is no greater than a half the wavelength of sound in the attenuation frequency of interest for sound attenuation of the panels. In one embodiment of the present disclosure, the width of the stripes or the diameter of the area of second glue 402 and 502 is no greater than 2 inches.

Continuing to refer to FIGS. 4a-c and FIGS. 5a-c, some embodiments of the present invention may have glue patterns 402 and 502 oriented perpendicularly with respect to the illustrated pattern. That is, the short side of the panel would be the vertical edge, and the long side of the panel would be the horizontal edge of the panel, keeping the lateral distances 406 and 506 between stripes and rows of glue patterns 402 and 502, respectively, along the horizontal direction. As previously stated, distances 406 and 506 correspond to the spacing of the structural framing members to which the panels will be attached.

Figure 6:
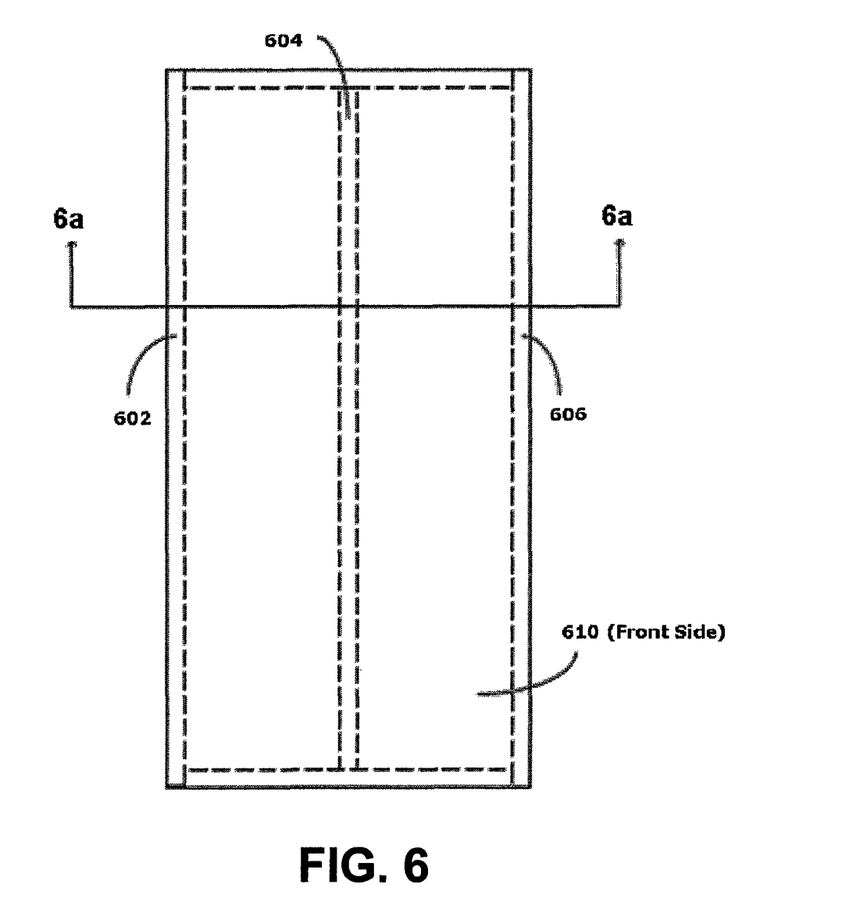
FIG. 6 shows a plan view of a wall structure built using laminated panels as disclosed in FIG. 1.
Figure 6A:
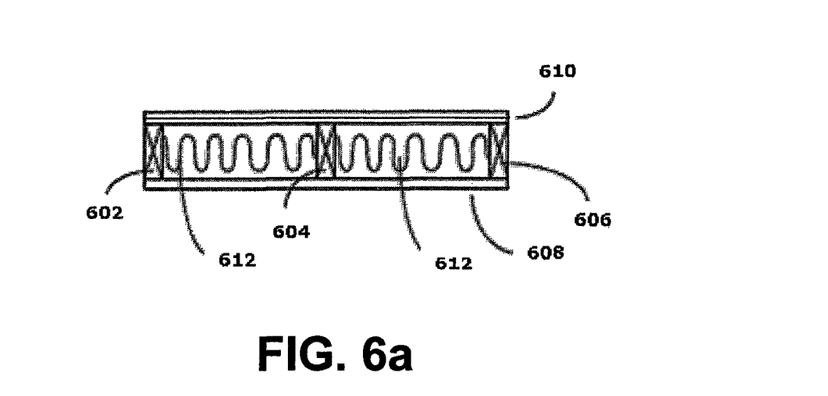
FIG. 6a shows a cross sectional view of a wall structure built using laminated panels as disclosed in FIG. 1.

Referring to FIGS. 6 and 6a, a typical framed wall assembly 600 is shown. FIG. 6 shows a plan view of wall assembly 600, and FIG. 6a shows a cross-sectional view of wall assembly 600. This assembly includes a front side 610 which is constructed using a material such as laminated panel 100 disclosed in FIG. 1, and a rear panel 608 which is a single layer of type X gypsum wallboard. Panels 608 and 610 are attached to 2×4 studs 602, 604 and 606. These will be better appreciated by reference to the cross sectional view of FIG. 6a. Batt-type or blown-in thermal insulation 612 is located in each of cavities 618 and 620 which are enclosed between the 2×4 stud structures. The structural adhesive according to some embodiments of the present disclosure will correspond to the center lines of studs 602, 604, and 606.

Figure 7A:
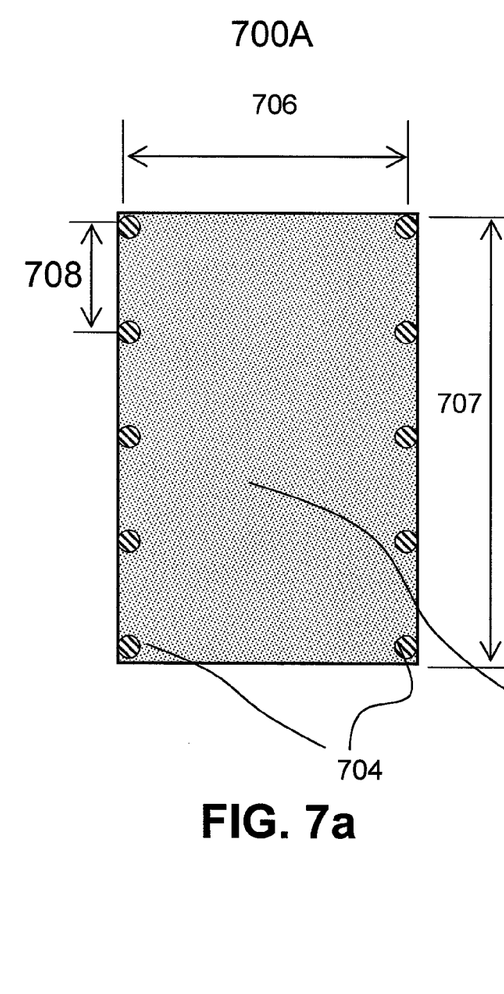
FIG. 7a shows a plan view of a laminated panel built according to some embodiments of the present disclosure, with structural adhesive dots placed along the long edges of the panel, and a viscoelastic glue covering the rest of the panel area.

FIG. 7a shows a plan view of a laminated panel 700A, built according to some embodiments of the present disclosure. In one implementation, panel 700A has a width 706 of four (4) feet, and a length 707 of eight (8) feet, and is built with laminated layers as depicted in FIGS. 1 and 2, including top layer 102, bottom layer 104, and a glue layer comprising a patterned layer of a first glue 702 and a second glue 704. The first glue 702 includes a viscoelastic polymer as in first glue 106 of FIG. 1, and the second glue 704 includes a structural adhesive as in second glue 108 of FIG. 1. Structural adhesive 704 is placed along each of the long edges of the panel, at intervals 708 of two feet. In the embodiment depicted in FIG. 7a, second glue 704 is applied in circular areas containing about 0.4 ml of adhesive each. The rest of the surface area of the glue layer is covered uniformly with viscoelastic glue layer 702.

Figure 7B:
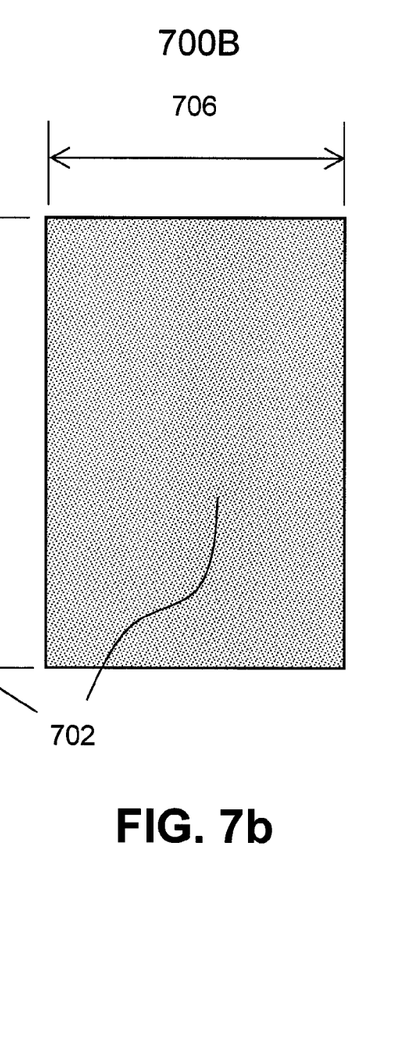
FIG. 7b shows a plan view of a laminated panel using a viscoelastic glue for improved sound isolation performance, with no structural adhesive.

FIG. 7b shows a plan view of a laminated panel 700B, having dimensions 706 and 707 as in FIG. 7a, except that the laminated structure of panel 700B includes only a viscoelastic glue layer 702, covering the entire surface of the panel. Panel 700B is built according to one embodiment of the present disclosure in which two external layers of a selected material are separated by a layer of viscoelastic glue 106 placed between them. Panel 700B may be constructed according to FIG. 1. That is, first glue 106 covers the entire surface area in between external layers 102 and 104, without using second glue 108. In some embodiments of Panel 700B, the two external layers are two layers of gypsum, and the viscoelastic glue is a glue (i.e. first glue 106), made of materials as set forth in TABLE 1. The viscoelastic glue of panel 700B may have a shear modulus between $10^2$ to $10^6$ N/m$^2$ (or Pascals). Panel 700B may achieve maximum reduction of noise transmission at low frequencies (e.g. between 60 Hz and 500 Hz), at high frequencies (e.g. between 500 Hz and 8000 Hz), or at both low frequencies and high frequencies simultaneously.

Figure 7C:
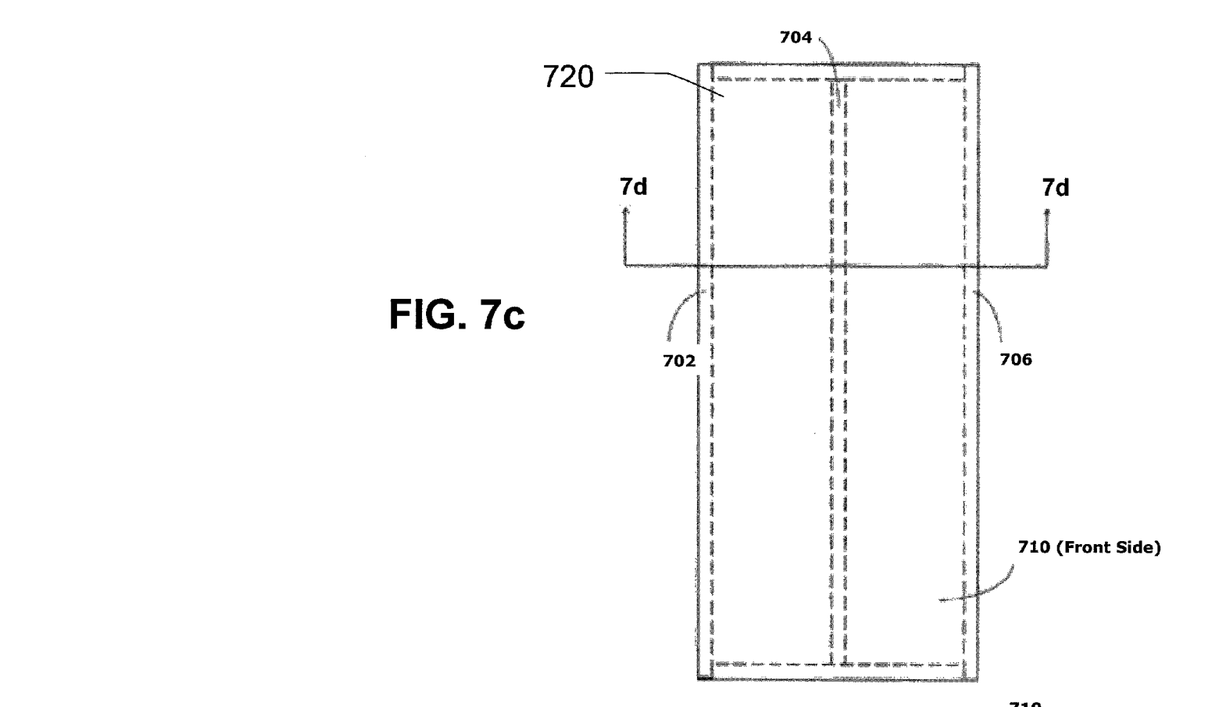
FIG. 7c-d show a plan view and a cross sectional view, respectively, of a wall structure built using laminated panels as disclosed in either of FIG. 7a and FIG. 7b.
Figure 7D:
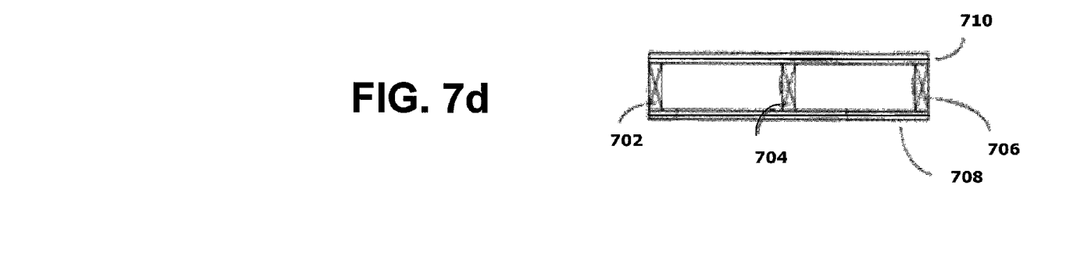

FIGS. 7c and 7d show plan and cross sectional views of framed wall assembly 720. Assembly 720 includes a front side 710 and a back side 708, which are constructed using a material such as laminated panel 700A, disclosed in FIG. 7a. In some embodiments of the present disclosure, framed wall assembly 720 may include laminated panels 700B in the front side 710 and the back side 708. Panels 708 and 710 are attached to 2×4 studs 702, 704 and 706. Assembly 720 will be better appreciated by reference to the cross sectional view of FIG. 7d. The structural adhesive 704 of framed wall assembly 720, when a laminated panel 700A (cf. FIG. 7a) is used in the front side 710 and the back side 708 of wall assembly 720, will be aligned to the center lines of studs 702 and 706.

Figure 8:
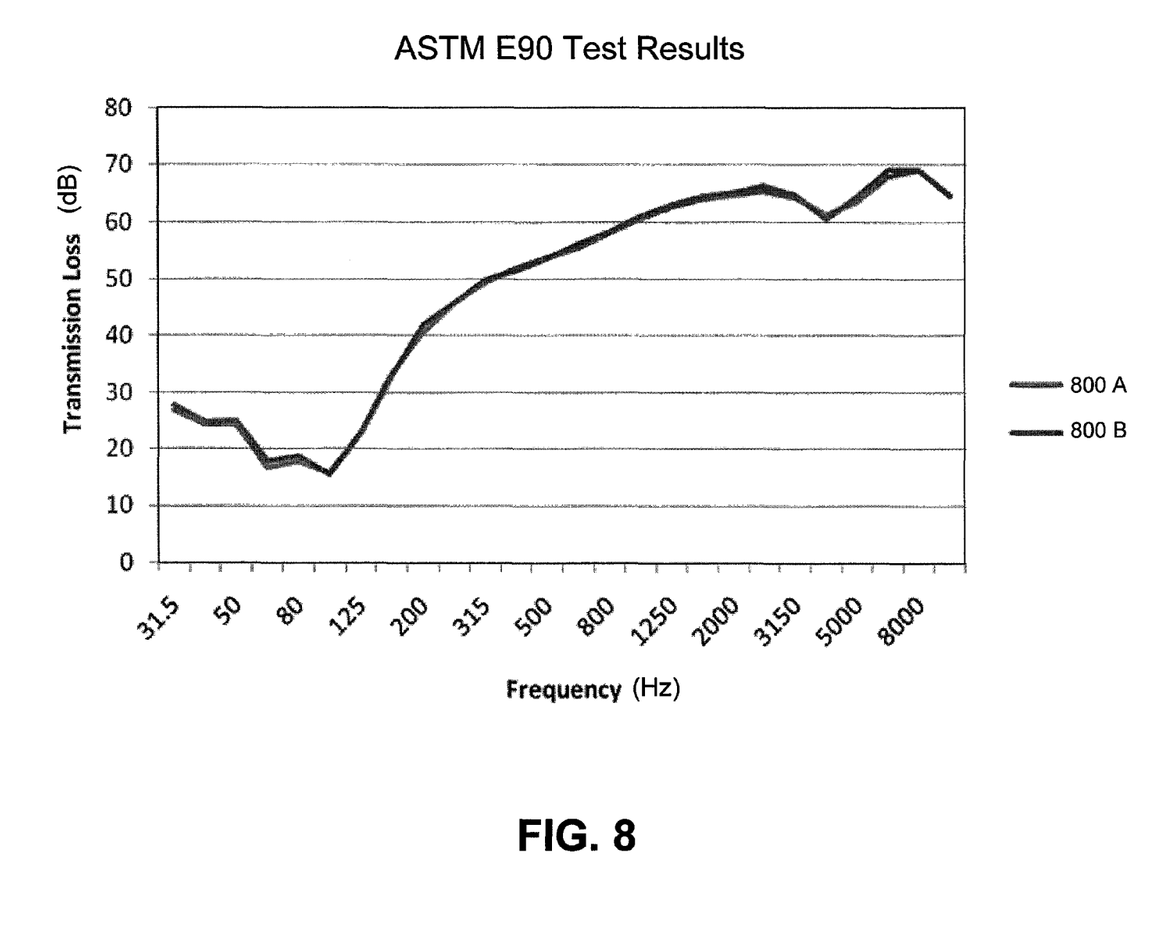
FIG. 8 shows a noise transmission chart with test results for two wall structures built according to some embodiments of the present disclosure.

FIG. 8 shows the results of a noise transmission test performed according to test protocol ASTM E90 on framed wall assembly 720 under two different test conditions. In case 800A, laminated panels 710 and 708 of framed wall assembly 720 are provided by laminated panel 700A. In case 800B, laminated panel 700A is replaced by laminated panel 700B in both panels 710 and 708 of framed wall assembly 720. The result, as show in FIG. 8, is that laminated panels 700A performed identically to laminated panels 700B (i.e., rendering an STC value of 47), with only statistically insignificant differences between the two cases. The conclusion derived from the data shown in FIG. 8 is that the addition of structural adhesive areas to laminated panels according to the embodiments disclosed in the present disclosure has no effect upon the acoustic performance of laminated panels constructed with viscoelastic glue, according to the embodiments disclosed herein.

As one of regular skill in the art of building construction would realize, the dimensions given for each material in the laminated panels according to some embodiments of the present disclosure can be varied in view of cost, overall thickness, weight and desired sound transmission properties, without affecting the overall sound attenuation performance and structural integrity of the panels.

The above-described embodiments and their dimensions are illustrative only, and not limiting. In addition, other embodiments of the present disclosure will be obvious in view of the above description.

What is claimed is:

1. A laminated panel for use in building construction as part of a wall, floor, ceiling, or door, said panel comprising:
   a first external layer of material;
   a first layer of glue placed adjacent to the first layer of material;
   a second external layer of material placed on the other side of the first layer of glue; wherein
   the first layer of glue comprises:
      a viscoelastic glue having a shear modulus between $10^2$ Pascals to $10^6$ Pascals, the first layer of glue providing a sound transmission loss for the laminated structure greater than 50 dB at room temperature for sound frequencies of about 1 kHz; and
      a structural adhesive having a shear modulus of $10^6$ Pascals or more.

2. The laminated panel of claim 1, further comprising:
   a perimeter area and nailing regions for attaching the panel to a structural component of a building, wherein the structural adhesive covers the perimeter area and the nailing regions of the panel.

3. The laminated panel of claim 1, further wherein:
   the viscoelastic glue covers an area within the areas between the structural framing locations of the panel; and
   the structural adhesive covers an area that overlaps with structural framing locations of the expected assembly.

4. The laminated panel of claim 1, further wherein the viscoelastic glue forms a first pattern and the structural adhesive forms a second pattern, wherein the first pattern covers an area no less than 20% of a total surface area of the panel.

5. The laminated panel of claim 1, further wherein the viscoelastic glue forms a first pattern and the structural adhesive forms a second pattern, wherein the first pattern comprises shapes having edges wherein the distance between the edges of two different shapes is no greater than ½ the wavelength of sound in the attenuation frequency of interest; and the second pattern comprises shapes with a diameter no less than ⅛ of an inch.

6. A building structure for use as part of a wall, floor, ceiling or door, comprising:
   two panels attached to a structural frame; wherein
   at least one panel comprises a laminated panel; said laminated panel further comprising:
      a first external layer of material;
      a first layer of glue placed adjacent to the first layer of material;
      a second external layer of material placed on the other side of the first layer of glue; wherein
         the first layer of glue comprises a sound absorbing viscoelastic glue formed in a first pattern and a structural adhesive formed in a second pattern; wherein
      the first pattern and the second pattern are non-overlapping and are provided on the same horizontal plane; a shear modulus of the structural adhesive is at least $10^6$ Pa; and a shear modulus of the viscoelastic glue is less than $10^4$ Pa.

7. The building structure of claim 6, further wherein the first pattern covers an area no less than 20% of a total surface area of the panel.

8. The building structure of claim 6, further wherein the first pattern comprises shapes having edges wherein the distance between the edges of two different shapes is no greater than ½ the wavelength of sound in the attenuation frequency of interest; and the second pattern comprises shapes with a diameter no less than ⅛ of an inch.

9. A building structure for use as part of a wall, floor, ceiling or door, comprising:
   two panels attached to a structural frame; wherein
      at least one of the panels comprises a laminated panel; said laminated panel further comprising:
      a first external layer of material;
      a first layer of glue placed adjacent to the first layer of material;
      a second external layer of material placed on the other side of the first layer of glue;
   wherein
      the first layer of glue comprises:
         a viscoelastic glue having a shear modulus between $10^2$ Pascals to $10^6$ Pascals, the first layer of glue providing a sound transmission loss for the laminated structure greater than 50 dB at room temperature for sound frequencies of about 1 kHz; and a structural adhesive having a shear modulus of $10^6$ Pascals or more.

10. The building structure of claim 9, further wherein the viscoelastic glue forms a first pattern and the structural adhesive forms a second pattern, wherein the first pattern covers an area no less than 20% of a total surface area of the panel.

11. The building structure of claim 9, further wherein the viscoelastic glue forms a first pattern and the structural adhesive forms a second pattern, wherein the first pattern comprises shapes having edges wherein the distance between the edges of two different shapes is no greater than ½ the wavelength of sound in the attenuation frequency of interest; and the second pattern comprises shapes with a diameter no less than ⅛ of an inch.

12. A method for making a laminated panel for use in building construction as part of a wall, floor, ceiling or door, and further comprising:
    placing a first external layer of material;
    placing a first layer of glue adjacent to the first layer of material;
    placing a second external layer of material on the other side of the first layer of glue; wherein placing the first layer of glue comprises forming a viscoelastic glue in a first pattern and a structural adhesive in a second pattern; wherein
    the first pattern and the second pattern are non-overlapping and are provided on the same horizontal plane, a shear modulus of the structural adhesive is at least $10^6$ Pa; and a shear modulus of the viscoelastic glue is less than $10^4$ Pa.

13. The method of claim 12, further wherein forming a structural adhesive in a second pattern comprises placing the structural adhesive in a perimeter area and nailing regions for attaching the panel to a structural component of a building.

14. The method of claim 12, further wherein forming a viscoelastic glue in a first pattern comprises covering an area within the areas between the structural framing locations of the panel with the viscoelastic glue; and
    forming a structural adhesive in a second pattern comprises covering an area that overlaps with structural framing locations of the expected assembly with the structural adhesive.

15. The method of claim 12, further wherein forming a viscoelastic glue in a first pattern comprises covering an area greater than 20% of a total surface area of the panel with the viscoelastic glue.

16. The method of claim 12, further wherein forming a viscoelastic glue in a first pattern comprises forming shapes having edges wherein the distance between the edges of two different shapes is no greater than ½ the wavelength of sound in the attenuation frequency of interest; and forming a structural adhesive in a second pattern comprises forming shapes with a diameter greater than ⅛ of an inch.

17. A laminated panel for use in building construction as part of a wall, floor, ceiling, or door, said panel comprising:
    a first external layer of material;
    a first layer of glue placed adjacent to the first layer of material;
    a second external layer of material placed on the other side of the first layer of glue; wherein
    the first layer of glue comprises a viscoelastic glue formed in a first pattern and a structural adhesive formed in a second pattern, the viscoelastic glue having a glass transition temperature below room temperature; wherein
    the first pattern and the second pattern are non-overlapping and are provided on the same plane, a shear modulus of the structural adhesive is at least $10^6$ Pa; and a shear modulus of the viscoelastic glue is less than $10^4$ Pa.

18. The laminated panel of claim 17, further wherein:
    the viscoelastic glue has a shear modulus greater than $10^2$ Pascals; and
    the structural adhesive glue has a shear modulus lower than $10^8$ Pascals.

19. The laminated panel of claim 17, further comprising:
    a perimeter area and nailing regions for attaching the panel to a structural component of a building, wherein
    the second pattern covers the perimeter area and the nailing regions of the panel.

20. The laminated panel of claim 17, further wherein:
    the first pattern covers an area within the areas between the structural framing locations of the panel; and
    the second pattern covers an area that overlaps with structural framing locations of the expected assembly.

21. The laminated panel of claim 17, further wherein:
    the second pattern comprises an array of vertical stripes that have a center to center separation of 24 inches, and further wherein each stripe has a width no less than about ⅛ of an inch, and no greater than about 2 inches.

22. The laminated panel of claim 17, further wherein:
    the second pattern comprises an array of vertical stripes that have a center to center separation of 16 inches, and further wherein each stripe has a width no less than about ⅛ of an inch, and no greater than about 2 inches.

23. The laminated panel of claim 17, further wherein:
    the second pattern comprises an array of vertical stripes that have a center to center separation of 48 inches, and further wherein each stripe has a width no less than about ⅛ of an inch, and no greater than about 2 inches.

24. The laminated panel of claim 17, further wherein the first pattern and the second pattern are selected such that the first pattern of glue covers an area no less than 20% of the total surface area of the panel.

25. The laminated panel of claim 17, further wherein the first pattern and the second pattern are selected such that the first pattern comprises shapes having edges wherein the distance between the edges of two different shapes is no greater than ½ the wavelength of sound in the attenuation frequency of interest; and the second pattern comprises shapes with a diameter no less than ⅛ of an inch.

26. The laminated panel of claim 17, further wherein:
    at least one of the first and second external layers of material comprises a layer of gypsum.

27. The laminated panel of claim 17, further wherein:
    at least one of the first and second external layers of material is selected from the group consisting of wood, cement-based board, magnesium oxide-based board, and calcium silicate board.

* * * * *